United States Patent [19]
Reeve

[11] 3,710,639
[45] Jan. 16, 1973

[54] DRIVE MECHANISM
[75] Inventor: John Edwin Reeve, London, England
[73] Assignee: Thorn Electrical Industries Limited, London, England
[22] Filed: Sept. 13, 1971
[21] Appl. No.: 179,823

[30] Foreign Application Priority Data
Sept. 16, 1970 Great Britain...................44,316/70

[52] U.S. Cl. ....................74/393, 74/84, 74/425.5, 74/426
[51] Int. Cl.......F16h 35/02, F16h 1/16, F16h 27/04
[58] Field of Search................74/424.5, 426, 393, 84

[56] References Cited
UNITED STATES PATENTS
3,049,017  8/1962  McDonald et al.................74/426 X Primary Examiner—Leonard H. Gerin
Attorney—Kemon, Palmer & Estabrook

[57] ABSTRACT

An intermittent drive mechanism for use in machine tools has driving and driven members coupled by constant ratio gears. In one range of relative positions of the gears drive is not transmitted through the gears but instead is transmitted through a cam and cam follower. The cam is so shaped as to cause a gradual deceleration of the driven member to zero followed by a gradual acceleration up to the speed maintained by the constant ratio gears.

8 Claims, 8 Drawing Figures

PATENTED JAN 16 1973 3,710,639

SHEET 1 OF 2 divided shaft 12. The driving shaft 10 carries a cylindrical cam 14 and a worm or spiral pinion 16, and the driven shaft 12 carries a worm wheel or spiral gear 18 for engagement with the worm or spiral pinion 16. As illustrated, two cam follower "sets" 20 are attached to the worm wheel 18 for engagement with the cam 14. Each "set" in this context consists of two followers.

DRIVE MECHANISM

BACKGROUND OF THE INVENTION

This invention relates to a drive mechanism for producing intermittent or cyclically variable motion. Such devices, commonly known as indexing mechanisms, are used in machine tools, packaging machines and other special purpose machines for effecting the transfer of workpieces, or of a part of the machine, through a number of predetermined positions in sequence.

Conventionally a Geneva mechanism or a cam and follower system is used where definite control of the indexing motion is necessary. Such mechanisms must be large, and therefore costly, when used to index a heavy mass through a large angle, because all the energy required for this purpose must be transmitted during one revolution or less of the driving member.

SUMMARY OF THE INVENTION

An object of the invention is to provide an indexing mechanism which is of exceedingly simple construction and yet which is effective in operation.

The invention consists in a drive mechanism which has a cam and cam follower coupled to respective ones of a driving member and a driven member. The cam follower engages with the cam when the members are within a range of relative positions to transmit drive from the driving member to the driven member, and when the members are not within said range drive is effected through constant ratio gears. By appropriately shaping the cam, the drive mechanism can be constructed so as to cause the driven member to experience a predetermined acceleration, a constant speed (drive being through the constant ratio gears) and then a predetermined deceleration.

Preferably the cam is on the driving member and the cam followers are on the driven member. Conveniently the gears may comprise a first gear on the driving member and a second gear on the driven member which engages with the first gear but which has teeth missing corresponding to the said ranges of positions where drive is transmitted through the cam and cam follower.

BRIEF DESCRIPTION OF THE DRAWINGS

Other objects and advantages of the invention will become apparent from a description of the following detailed description taken with reference to the accompanying drawings, in which.

DETAILED DESCRIPTION OF THE PREFERRED EMBODIMENTS

Figure 1:
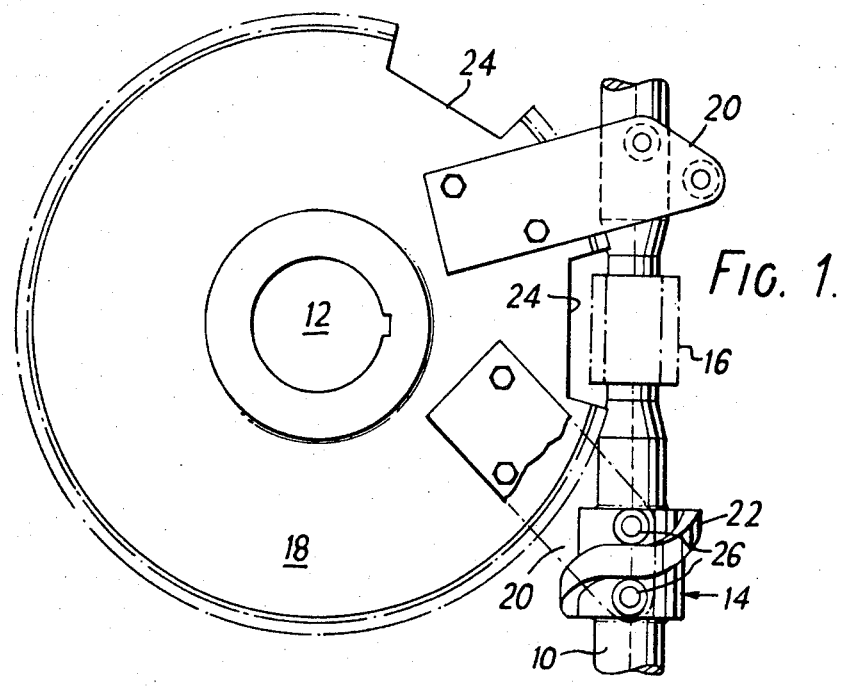
FIG. 1 is a plan view of a first indexing mechanism embodying the invention.
Figure 2:
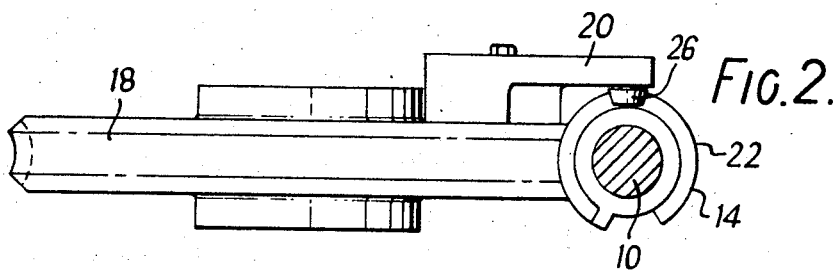
FIG. 2 is a side view of the mechanism of FIG. 1.

The mixed motion drive mechanism shown in FIGS. 1 and 2 transmits drive from a driving shaft 10 to a driven shaft 12. The driving shaft 10 carries a cylindrical cam 14 and a worm or spiral pinion 16, and the driven shaft 12 carries a worm wheel or spiral gear 18 for engagement with the worm or spiral pinion 16. As illustrated, two cam follower "sets" 20 are attached to the worm wheel 18 for engagement with the cam 14. Each "set" in this context consists of two followers.

The cam track 22 of the cam 14 is of varying "slope", i.e. at the ends of the track drive is transmitted from the cam to the cam follower while at the center of the track (the position illustrated in FIGS. 1 and 2) no drive is transmitted. Thus on rotation of the cam 14 from one end of its travel to the other at constant speed the cam follower set will experience controlled deceleration to zero speed followed by controlled acceleration.

The speed attained by the driven member when the cam follower set 20 reaches the end of the track 22 is maintained by the worm 16 engaging with the worm wheel 18 as the follower 20 nears the end of the track 22. This constant speed ratio is maintained until the next cam follower set 20 engages the cam 14.

While the cam follower set 20 is in engagement with the cam 14 it is necessary to disengage the constant ratio drive through the worm 16 and worm wheel 18. In the example illustrated this is achieved by forming the worm wheel 18 with the teeth missing, as at 24, corresponding to the position where the cam follower engages with the cam.

The cam track 22 is raised from the surface of the cam 14 and each cam follower set 20 includes two rollers 26 which engage respective sides of the track 22. An alternative arrangement is shown in FIG. 3, in which the cam track takes the form of a groove 30 and each cam follower set consists of a single roller 32 which runs in the groove.

Figure 3:
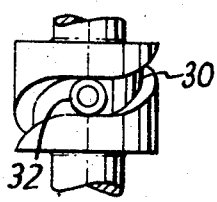
FIG. 3 shows an alternative cam for use in the mechanism of FIG. 1.
Figure 4:
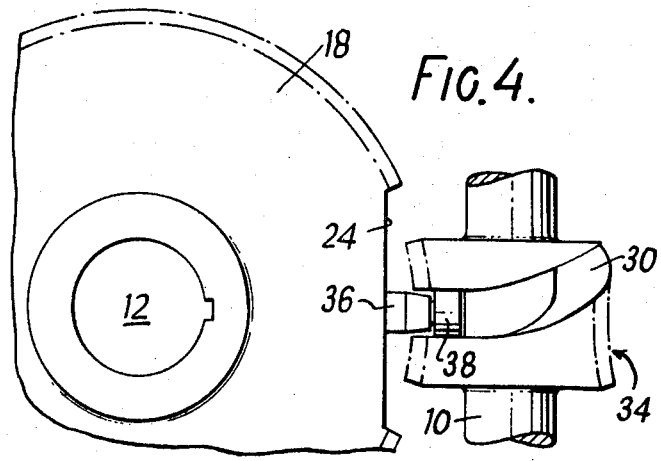
FIGS. 4, 5 and 7 are plan views of three further indexing mechanisms embodying the invention.

The cam of FIG. 3 can be readily modified as shown in FIG. 4 to provide a drive mechanism of particularly simple construction. Here, the outer surface of the cam 34 is toothed to provide a straight or globoidal worm which engages with the worm wheel 18. A cam follower set 36 projects from the center of the missing-tooth portion 24 in the worm wheel 18 and carries a single roller 38 which engages the track 30 in the worm 34.

Figure 5:
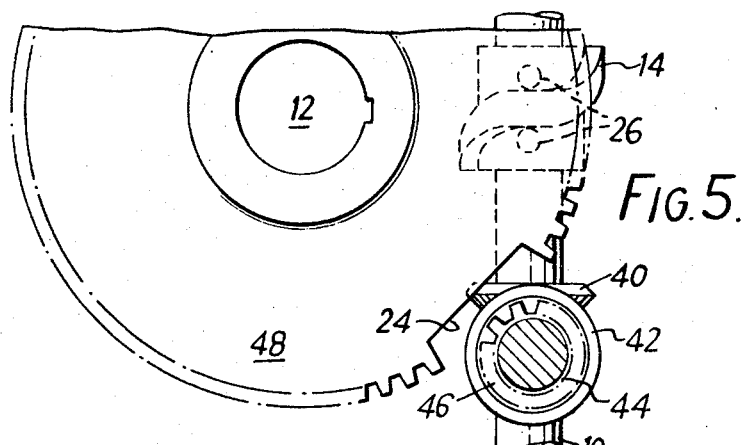
Figure 6:
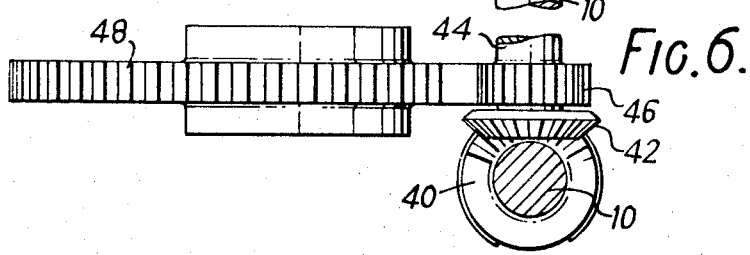
FIGS. 6 and 8 are views similar to FIG. 2 of the mechanisms of FIGS. 5 and 7 respectively.

In the embodiment shown in FIGS. 5 and 6 the cam 14 is similar to that of FIG. 1. However, the worm 16 is replaced by a bevel gear 42 on the shaft 44. A spur pinion 46 is also fixed on the shaft 44 and engages a spur gear 48 mounted on the shaft 12 and which replaces the worm wheel 18 of FIG. 1. The spur gear 48 carries the cam followers 26 and also has a gap 24 where there are no teeth, in which position the cam and cam follower are in engagement.

Figure 7:
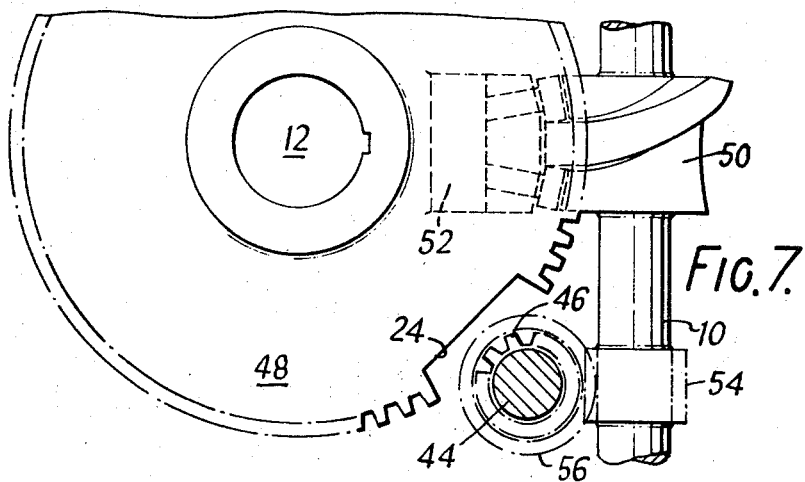
Figure 8:
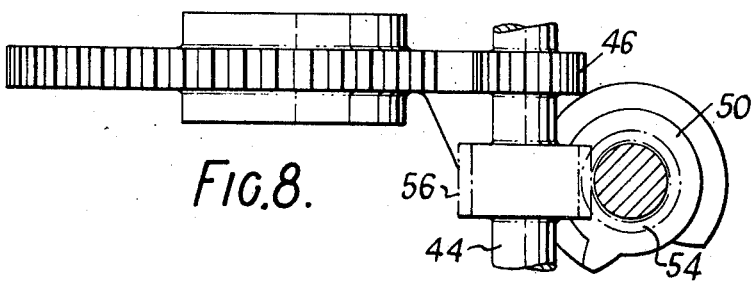

FIGS. 7 and 8 show a further embodiment which employs a concave globoidal cam 50 which engages with a cam follower set 52 attached to the spur gear 48 which is mounted on the driven shaft 12. The shaft 10 also carries a spiral gear 54 which engages a spiral gear 56 on a shaft 44 which also carries a spur pinion 46 for engagement with the spur gear 48. Again, the spur gear 48 has a gap 24 where teeth are missing, and on rotation of the shaft 10 from the position illustrated first the gear 48 is accelerated to constant speed by the cam 50, whereupon the pinion 46 engages the gear 48 and drive is transmitted at constant speed ratio. When the gap 24 again reaches the pinion 46 the follower 52 again engages the cam 50 to decelerate the gear 48 to rest.

The arrangements illustrated enable an indexing cycle to occupy more than one revolution of the driving member, thus saving space and cost. Furthermore, successive indexing cycles need not employ the same number of revolutions.

I claim:

1. A drive mechanism, comprising:
   a driving member;
   a driven member;
   a cam coupled to one of said members;
   a cam follower coupled to the other of said members for engagement with said cam when said members are within a range of relative positions to transmit drive from said driving member to said driven member; and
   constant ratio gears connecting said driving and driven members when said members are not within said range of relative positions.

2. A drive mechanism as claimed in claim 1, wherein said cam is shaped to provide a controlled acceleration prior to drive being effected through said constant ratio gears and a controlled deceleration after drive from said constant ratio gears is discontinued.

3. A drive mechanism as claimed in claim 1, wherein said cam is on said driving member and said cam follower is on said driven member, and said constant ratio gears provide a decreased velocity ratio.

4. A drive mechanism as claimed in claim 1, wherein one of said constant ratio gears has teeth missing as positions corresponding to said range of position where drive is transmitted through said cam and cam follower.

5. A drive mechanism as claimed in claim 1, wherein said cam is formed in one of said constant ratio gears.

6. A drive mechanism as claimed in claim 1, wherein said constant ratio gears comprise a worm driven by said driving member and a worm wheel driving said driven member.

7. A drive mechanism as claimed in claim 1, wherein said constant ratio gears comprise a pair of spur gears one of which is driven by said driving member and the other of which drives said driven member.

8. A drive mechanism as claimed in claim 1, having a plurality of cam followers with corresponding ranges of relative positions.

* * * * *